US008817186B1

(12) United States Patent
Lin

(10) Patent No.: US 8,817,186 B1
(45) Date of Patent: Aug. 26, 2014

(54) VIDEO PLAYING APPARATUS AND VIDEO DISPLAYING APPARATUS

(71) Applicant: Gemtek Technology Co., Ltd., Hukou Township, Hsinchu County (TW)

(72) Inventor: Chih-Cheng Lin, Hukou Township, Hsinchu County (TW)

(73) Assignee: Gemtek Technology Co., Ltd., Hukou Township, Hsinchu County (TW)

( * ) Notice: Subject to any disclaimer, the term of this patent is extended or adjusted under 35 U.S.C. 154(b) by 0 days.

(21) Appl. No.: 13/890,725

(22) Filed: May 9, 2013

(30) Foreign Application Priority Data

Mar. 29, 2013 (TW) ................................ 102111492

(51) Int. Cl.
*H04N 5/46* (2006.01)
*H04N 5/445* (2011.01)

(52) U.S. Cl.
CPC .................................... *H04N 5/445* (2013.01)
USPC .......................................... 348/555; 348/558

(58) Field of Classification Search
CPC ......... H04N 5/46; H04N 5/4401; H04N 5/44; G09G 5/006; G09G 5/005; G09G 2340/0407; G06F 9/4411; G06F 13/385; G06F 13/4022
USPC .......... 348/554, 555, 558, 706, 441; 345/698, 345/699; 710/8, 10, 11, 14–18, 104–106, 710/313, 65
See application file for complete search history.

(56) References Cited

U.S. PATENT DOCUMENTS

| | | | | |
|---|---|---|---|---|
| 6,580,461 | B2 * | 6/2003 | Chambers et al. | 348/458 |
| 6,714,251 | B2 * | 3/2004 | Nakamoto et al. | 348/458 |
| 7,907,208 | B2 * | 3/2011 | Chiba | 348/441 |
| 8,223,267 | B2 * | 7/2012 | Terajima | 348/554 |
| 2005/0068346 | A1 * | 3/2005 | Ogawa et al. | 345/699 |
| 2008/0079758 | A1 * | 4/2008 | Hayashibara | 345/699 |
| 2010/0165197 | A1 * | 7/2010 | Hattori | 348/554 |
| 2010/0268860 | A1 * | 10/2010 | Nikazm et al. | 710/105 |
| 2011/0181520 | A1 * | 7/2011 | Boda et al. | 345/173 |
| 2012/0002108 | A1 * | 1/2012 | Chiba | 348/453 |
| 2012/0191894 | A1 * | 7/2012 | Sasaki et al. | 710/313 |
| 2012/0287343 | A1 * | 11/2012 | Kelly et al. | 348/554 |
| 2013/0152149 | A1 * | 6/2013 | Park et al. | 725/114 |
| 2013/0286027 | A1 * | 10/2013 | Desselle et al. | 345/520 |
| 2014/0019653 | A1 * | 1/2014 | Amchislaysky et al. | 710/106 |

* cited by examiner

*Primary Examiner* — Victor Kostak
(74) *Attorney, Agent, or Firm* — Muncy, Geissler, Olds & Lowe, P.C.

(57) ABSTRACT

A video playing apparatus includes a connecting port, a video outputting unit, a video processing unit, and a switching unit. The connecting port is coupled to a displaying apparatus, and outputs a first video signal or a second video signal. The video outputting unit generates the first video signal. The video processing unit is coupled to the video outputting unit and the connecting port. The video processing unit receives the first video signal, converting the first video signal to the second video signal, and then outputs the second video signal. The switching unit is coupled to the video outputting unit, the video processing unit, and the connecting port. The switching unit switches the output of the first video signal between the connecting port and the video processing unit according to a control signal.

8 Claims, 4 Drawing Sheets

VIDEO PLAYING APPARATUS AND VIDEO DISPLAYING APPARATUS

CROSS-REFERENCE TO RELATED APPLICATIONS

This non-provisional application claims priority under 35 U.S.C. §119(a) on Patent Application No(s). 102111492 filed in Taiwan, R.O.C. on Mar. 29, 2013 the entire contents of which are hereby incorporated by reference.

BACKGROUND OF THE INVENTION

1. Technical Field of the Invention

The disclosure relates to a video playing apparatus and a video displaying apparatus, and more particularly to a video playing apparatus and a video displaying apparatus that can play or display multiple video standards.

2. Description of the Related Art

The conventional video playing apparatus can be connected to a displaying apparatus to play videos. Currently, displaying apparatuses available on the market are often matched to different video standards. Each displaying apparatus of a different video standard has its own interface and signal connecting port. Generally speaking, one video standard matches only with its particular type of signal connecting port. Therefore, it is difficult to output different types of video standards using only one signal connecting port.

Currently, to enable one video playing apparatus to output multiple video standards to the displaying apparatus connected to it, the video playing apparatus is equipped with multiple signal connecting ports. The video playing apparatus mentioned above can be equipped with signal connection ports of Mobile High-Definition Link (MHL) standard, High Definition Multimedia Interface (HDMI) standard, etc.

However, if a user would like to play a MHL video signal on a video playing apparatus that supports only HDMI standards, then the user would be required to purchase an extra decoder to perform HDMI to MHL signal decoding.

This creates superfluous components on the video playing apparatus, increasing not only the manufacturing cost but also the size of the printed circuit board. This is impractical to the user, since the development trend of video playing apparatuses is heading towards smaller and lighter hardware for easier portability. Therefore, the current video playing apparatus still has room for improvement.

SUMMARY OF THE INVENTION

In one embodiment, this disclosure provides a video playing apparatus, which includes a connecting port, a video outputting unit, a video processing unit, and a switching unit. The connecting port is selectively coupled to a displaying apparatus, and outputs a first video signal or a second video signal. The video outputting unit generates the first video signal. The video processing unit is coupled to the video outputting unit and the connecting port. The video processing unit receives the first video signal, and converts the first video signal to the second video signal, and then outputs the second video signal. The switching unit is coupled to the video outputting unit, the video processing unit, and the connecting port. The switching unit switches the output of the first video signal between the connecting port and the video processing unit according to a control signal.

In another embodiment, this disclosure provides a video displaying apparatus, which includes a video playing apparatus and a displaying apparatus. The video playing apparatus includes a connecting port, a video outputting unit, a video processing unit, and a switching unit. The connecting port is coupled to a displaying apparatus, and outputs a first video signal or a second video signal. The video outputting unit generates the first video signal. The video processing unit is coupled to the video outputting unit and the connecting port. The video processing unit receives the first video signal, converting the first video signal to the second video signal, and then outputs the second video signal. The switching unit is coupled to the video outputting unit, the video processing unit, and the connecting port. The switching unit switches the output of the first video signal between the connecting port and the video processing unit according to a control signal. The displaying apparatus is coupled to the connecting port. The displaying apparatus displays the first video signal or the second video signal depending on which one it receives.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
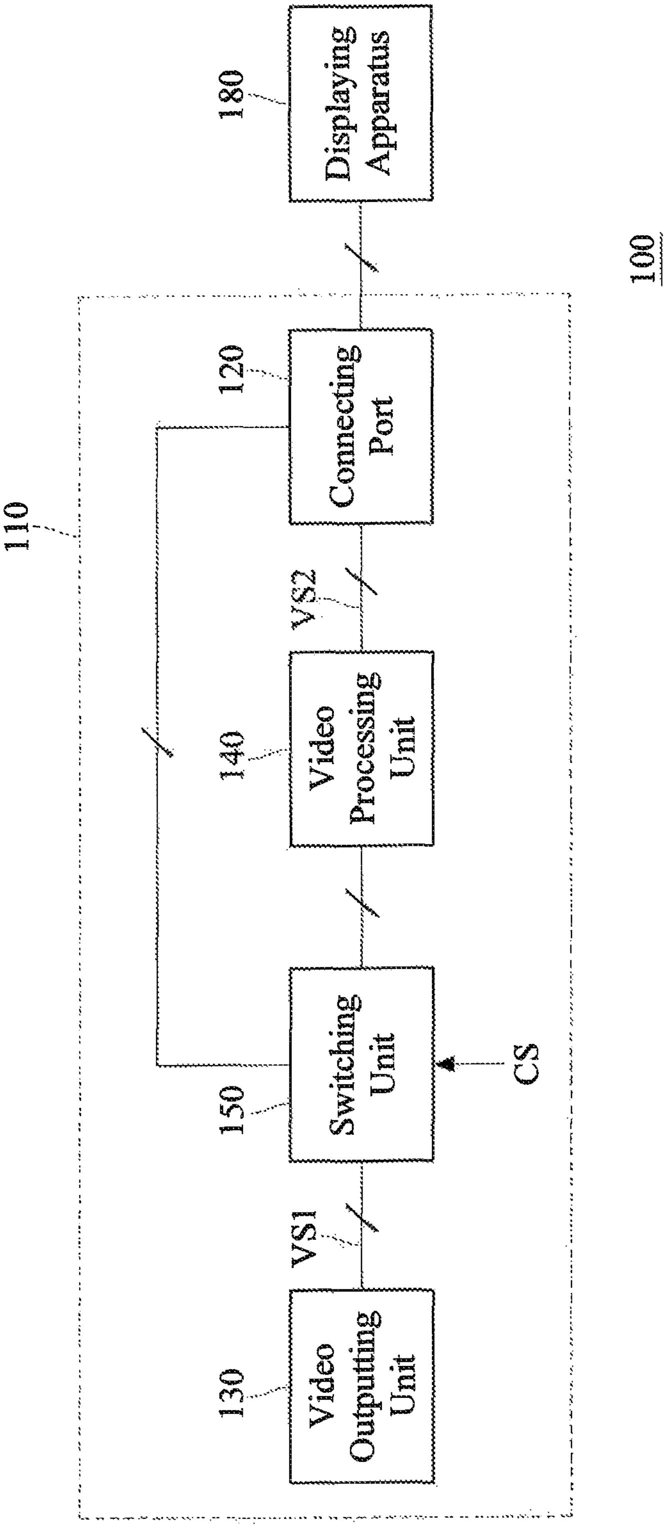
FIG. 1 is a schematic of a video displaying apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the embodiments below, the same number will be used to indicate the same or similar components.

Please refer to FIG. 1, a schematic of a video displaying apparatus of the present disclosure. A video displaying apparatus 100 includes a video playing apparatus 110 and a displaying apparatus 180. The video playing apparatus 110 includes a connecting port 120, a signal outputting unit 130, a video signal processing unit 140, and a switching unit 150.

The connecting port 120 outputs a first video signal VS1 or a second video signal VS2. In this embodiment, the first video signal VS1 is of a High Definition Multimedia Interface (HDMI) standard, and the second video signal VS2 is of a Mobile High-Definition Link (MHL) standard. The displaying apparatus 180 is coupled to the connecting port 120. The displaying apparatus 180 receives the first video signal VS1 or the second video signal VS2, and displays a video image according to the first video signal VS1 or the second video signal VS2 it receives.

In this embodiment, the connecting port 120 can be, for example, of a standard with more signal pins. For example, when the video playing apparatus 110 generates the first video signal VS1 as the HDMI standard and the second video signal VS2 as the MHL standard, then the connecting port 120 is of the HDMI interface. If the connecting port equipped on the displaying apparatus 180 is not of the HDMI interface, then an adaptor with HDMI to MHL properties can be used to connect the displaying apparatus 180 to the connecting port 120. In which, the adaptor mentioned above does not include decoding capabilities. The displaying apparatus 180 can then display the video image in a video standard according to the first video signal VS1 or the second video signal VS2 it receives.

The video outputting unit 130 generates the first video signal VS1, for example, a video signal of the HDMI standard. The video processing unit 140 is coupled to the video outputting unit 130. The video processing unit 140 receives the first video signal VS1, and converts the first video signal VS1 to the second video signal VS2, and then outputs the second video signal VS2, The second video signal VS2 is for example a video signal of the MHL standard.

The switching unit 150 is coupled to the video outputting unit 130, the video processing unit 140, and the connecting port 120. The switching unit 150 switches the first video signal VS1 to be outputted to either the connecting port 120 or the video processing unit 140, according to a control signal CS. When the control signal CS is, for example, at a low logic level, the switching unit 150 switches the first video signal VS1 to be outputted to the connecting port 120. The connecting port 120 then outputs the first video signal VS1 directly to the displaying apparatus 180. In other words, the displaying apparatus 180 contains, for example, the standard that matches that of the first video signal VS1.

When the control signal CS is, for example, at a high logic level, the switching unit 150 switches the first video signal VS1 to be outputted to the video processing unit 140. The video processing unit 140 then converts the first video signal VS1 to the second video signal VS2, and then outputs the second video signal VS2 to the connecting port 120. The connecting port 120 then outputs the second video signal VS2 to the displaying apparatus 180. In other words, the displaying apparatus 180 contains, for example, the standard that matches that of the second video signal VS2.

In this embodiment, the control signal CS is generated, for example, by the user manually switching or pressing a switching key. Which is to say, when the user is informed of the video standards supported by the displaying apparatus 180, the user can then manually switch the position of or press the switching key to generate the control signal CS accordingly. The above mentioned causes the control signal CS to control the switching unit 150 to switch the first video signal VS1 to the corresponding channel. This allows the connecting port 120 of the video playing apparatus 110 to output the first video signal VS1 or the second video signal VS2 accordingly.

The video playing apparatus 110 according to this embodiment uses the connecting port 120 of the one same standard to output the first video signal VS1 and the second video signal VS2 of different video standards to the displaying apparatus 180, which displays videos of the corresponding standard. This eliminates the necessity for the user to use additional video playing apparatuses to output the different corresponding video signals to displaying apparatuses of different video standards, thus making the video playing apparatus more convenient for the user.

In the embodiment described above, the second video signal VS2 of a MHL standard is used as an example. But the disclosure is not limited to this, the second video signal VS2 can also be of a Displayport or a Thunderbolt standard.

Figure 2:
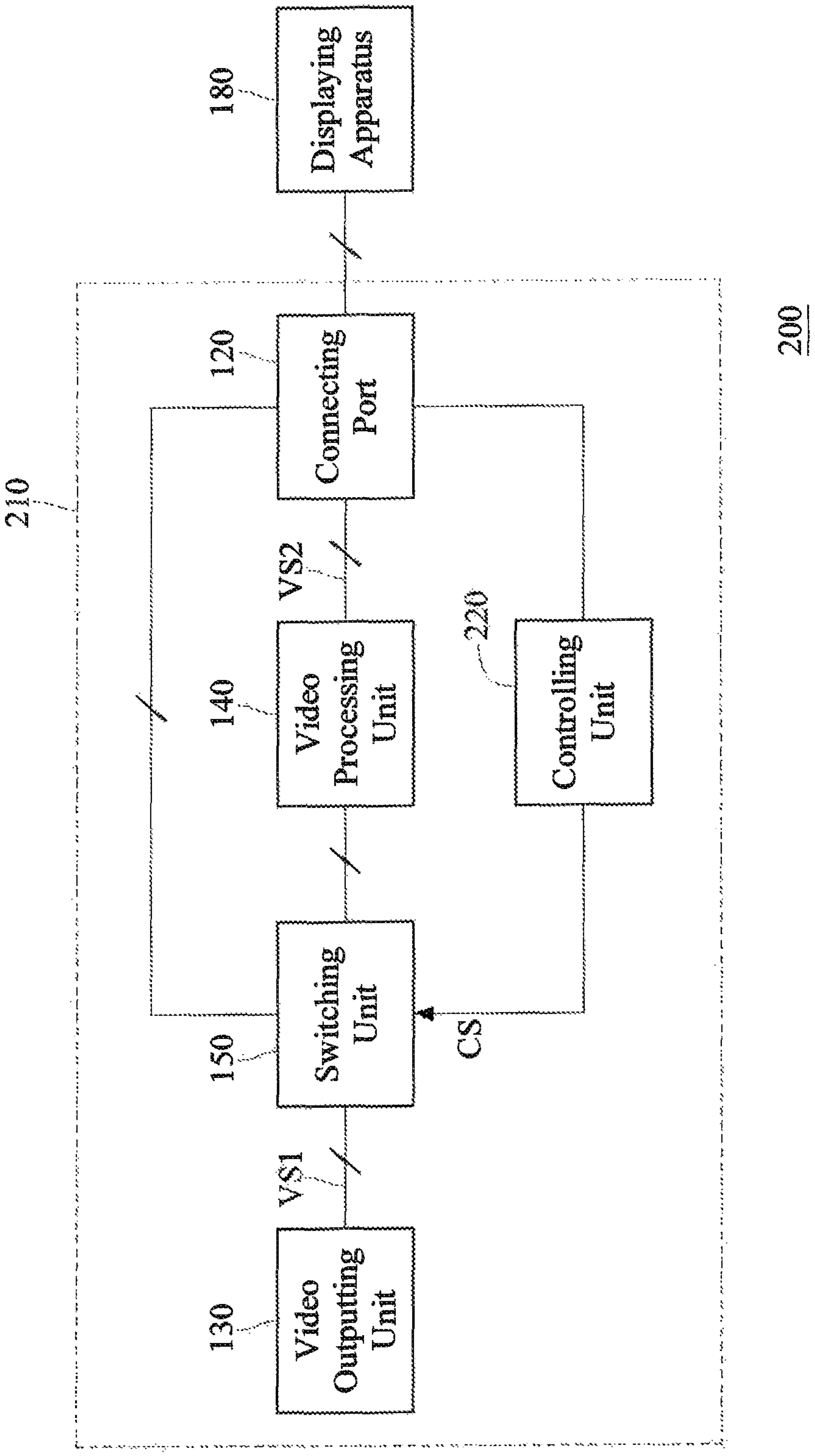
FIG. 2 is a schematic of another video displaying apparatus according to another embodiment of the disclosure.

Please refer to FIG. 2, a schematic of another video displaying apparatus of the present disclosure. A video displaying apparatus 200 includes a video playing apparatus 210 and a displaying apparatus 180. The video playing apparatus 210 includes a connecting port 120, a signal outputting unit 130, a video signal processing unit 140, a switching unit 150, and a controlling unit 220. Wherein the connection relations and operations of the connecting port 120, the signal outputting unit 130, the video signal processing unit 140, and the switching unit 15 are as described in the embodiment in FIG. 1, thus is not repeated here.

The controlling unit 220 is coupled to the switching unit 150 and the connecting port 120. The controlling unit 220 detects a mode signal generated by the displaying apparatus 180 and generates the control signal CS accordingly. In one embodiment, the mode signal includes, for example, video standards of the displaying apparatus 180, for example, relevant video standards such as model number, displaying resolution, etc.

In other words, when a connecting port equipped on the displaying apparatus 180 is connected to the connecting port 120 of the video playing apparatus 210, the displaying apparatus 180 sends the above mentioned mode signal to the controlling unit 220. Then the controlling unit 220, for example, decodes the mode signal to extract the video standard corresponding to the displaying apparatus 180. The controlling unit 220 then is able to generate the corresponding control signal CS for the switching unit 150, which allows the connecting port 120 of the video playing apparatus 210 to output the first video signal VS1 or the second video signal VS2 according to the control signal CS. Depending on the control signal CS, the switching unit 150 switches the first video signal VS1 to be outputted to the connecting port 120 or the video processing unit 140, much like that described in the embodiment of FIG. 1, thus will not be repeated here.

In another embodiment, when the connecting port 120 is coupled to the displaying apparatus 180 (which is the communication port of the displaying apparatus 180), the controlling unit 220 produces a control signal CS corresponding to the level of the mode signal. For example, if the displaying apparatus 180 is equipped with a HDMI standard connecting port, the displaying apparatus 180 will generate a low logic level mode signal when connected to the connecting port 210. The controlling unit 220 then outputs a low logic level control signal CS, corresponding to the low logic level mode signal. According to this low logic level control signal CS, the switching unit 150 switches the first video signal VS1 to the connecting port 120, which outputs this first video signal VS1 to the displaying apparatus 180.

If the displaying apparatus 180 is, for example, equipped with a MHL standard connecting port, the displaying apparatus 180 will generate a high logic level mode signal when connected to the connecting port 210. The controlling unit 220 then outputs a high logic level control signal CS, corresponding to the high logic level mode signal. According to this high logic level control signal CS, the switching unit 150 switches the output of the first video signal VS1 to the video processing unit 140. And then the video processing unit 140 converts the first video signal VS1 into the second video signal VS2. So the connecting port 120 outputs this second video signal VS2 to the displaying apparatus 180.

To further illustrate how the controlling unit 220 detects the mode signal generated by the displaying apparatus 180, an example is provided below.

Figure 3:
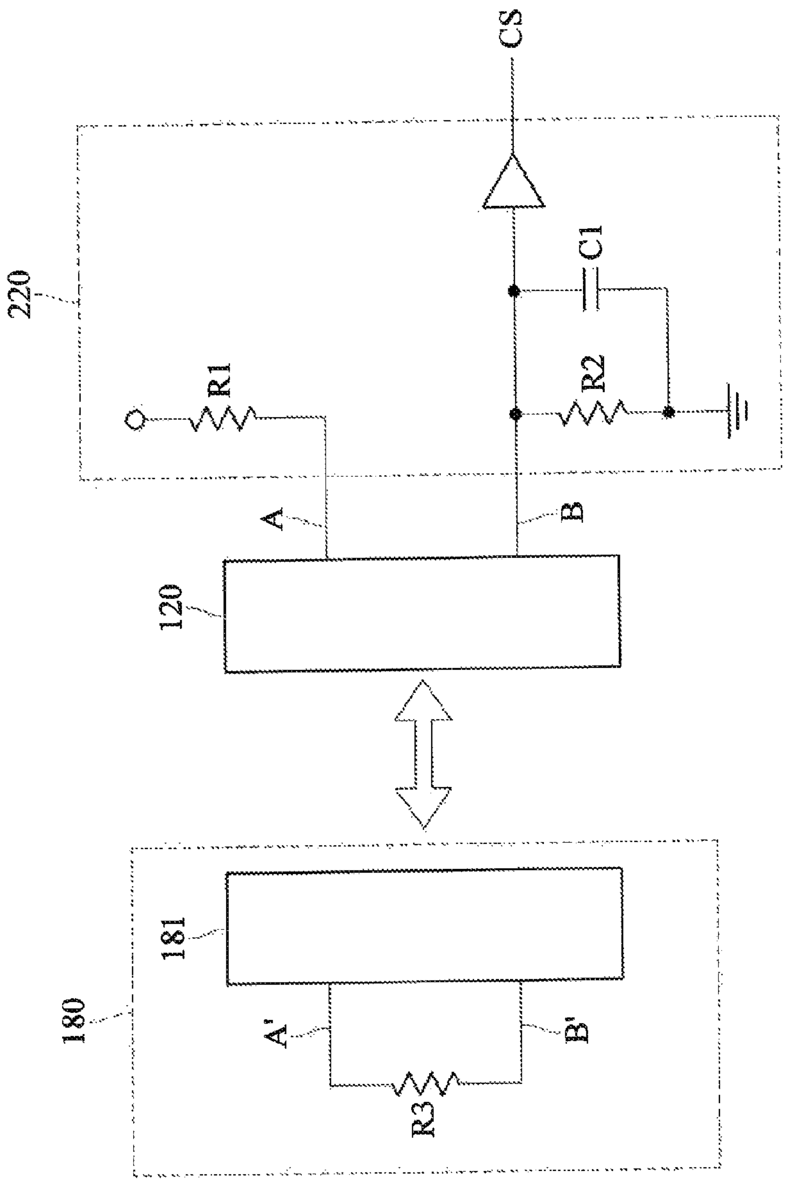
FIG. 3 illustrates a connecting status, showing a connecting port and a controlling unit of a video displaying apparatus connected to a connecting port of a displaying apparatus, according to an embodiment of the disclosure.

FIG. 3 illustrates a connecting status, showing a connecting port and a controlling unit of a video displaying apparatus connected to a connecting port of a displaying apparatus, according to an embodiment of the disclosure. In FIG. 3, a controlling unit 220 includes resistors R1, R2, a capacitor C1, and a buffer. In which, a first end of the resistor R1 is coupled to a voltage source, and a second end is coupled to a pin A of a connecting port 120.

A first end of the resistor R2 is coupled to a pin B of the connecting port 120, and a second end of the resistor R2 is coupled to ground. A first end of the capacitor C1 is coupled to the first end of the resistor R2, and a second end of the capacitor C1 is coupled to the second end of the resistor R2. An input end of the buffer is coupled to the first end of the capacitor C1, and an output end of the buffer outputs a control signal CS.

A displaying apparatus 180 includes a connecting port 181 and a resistor R3. The resistor R3 is coupled between pins A' and B' of the connecting port 181. The connecting port 181 can be for example of a MHL standard. So when a user couples the connecting port 120 to the connecting port 181, pin A is coupled to pin A' and pin B is coupled to pin B'. Then the voltage source, resistors R1, R3. R2, and ground forms a circuit loop, such that a voltage drop occurs across the resistor R2, making it a high logic level mode signal. This voltage drop across the resistor R2 (which is the high logic level mode signal) then gets outputted through the buffer to generate the high logic level control signal CS.

In this embodiment, the example shows a resistor (resistor R3) coupled between pins A' and B' of the connecting port 181 to indicate the video standard as the MHL standard, but the present disclosure is not limited by this. The same effect can also be achieved when this configuration of the connecting port 181 indicates the video standard as the Displayport standard or the Thunderbolt standard.

Figure 4:
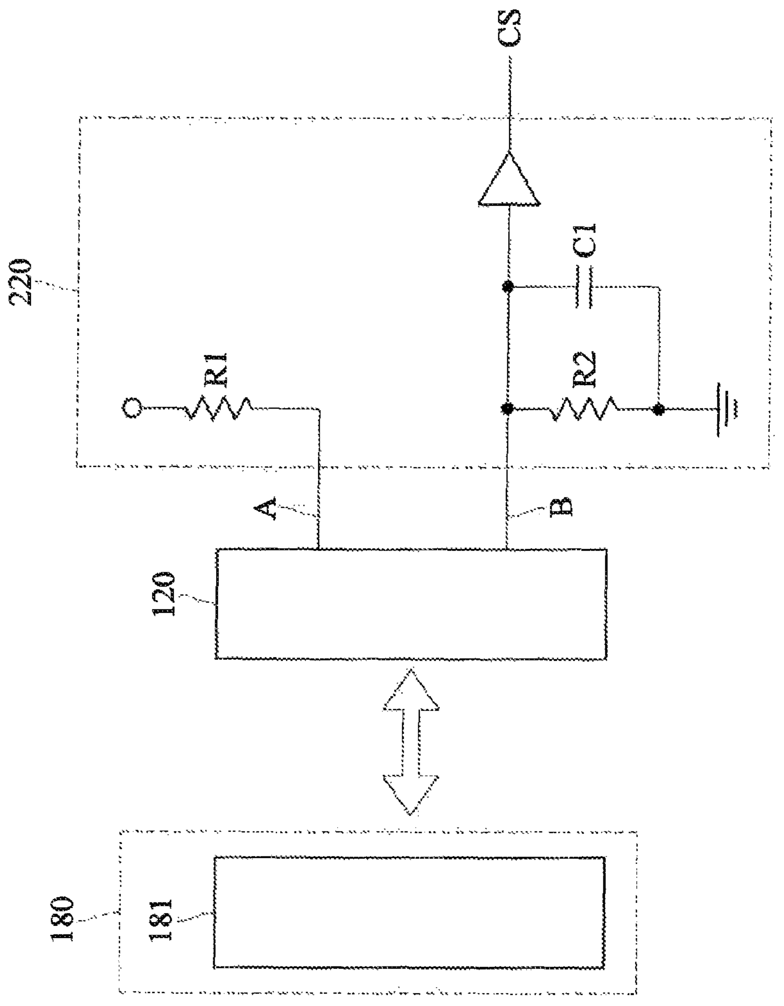
FIG. 4 illustrates another connecting status, showing a connecting port and a controlling unit of a video displaying apparatus connected to a connecting port of a displaying apparatus, according to another embodiment of the disclosure.

FIG. 4 illustrates another connecting status, showing a connecting port and a controlling unit of a video displaying apparatus connected to a connecting port of a displaying apparatus, according to another embodiment of the disclosure. The relations between each components within a controlling unit 220 in FIG. 4 follows that of FIG. 3, so will not be repeated here. In this embodiment, a displaying apparatus 180 includes a connecting port 181. The connecting port 181 is configured as, for example, a HDMI signal standard, which is to say the connecting port 181 does not have the resistor R3 between pins A' and B' of the connecting port 181 like in FIG. 3.

Therefore, when the user couples the connecting port 120 to the connecting port 181, pin A is coupled to pin A' and pin B is coupled to pin B'. No circuit loop forms, and no voltage drop occurs across the resistor R2, making it a low logic level mode signal. This low logic level mode signal then gets outputted through the buffer to become the low logic level control signal CS. The displaying apparatus 180 then plays a video of the HDMI standard accordingly.

The video playing apparatus and the video displaying apparatus according to the embodiments of the present disclosure uses a switching unit to switch the output of the first video signal to the connecting port to be outputted directly, or to switch the output of the first video signal to the video processing unit to be converted into the second video signal, which is then outputted by the connecting port. In which, the control signal can either be generated manually by the user or generated by a controlling unit according to what the controlling unit detects. Furthermore, the first video signal and the second video signal are both outputted through the same connecting port. This eliminates the hassle for the user to acquire a different displaying apparatus to accommodate the different video standard of each video playing apparatus, and increases convenience for the user.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A video playing apparatus, comprising:

a connecting port, selectively coupled to a displaying apparatus, for outputting a first video signal or a second video signal;

a video outputting unit for providing the first video signal;

a video processing unit, coupled to the video outputting unit and the connecting port, for receiving the first video signal, converting the first video signal to the second video signal, and then outputting the second video signal;

a switching unit, coupled to the video outputting unit, the video processing unit, and the connecting port, for switching the output of the first video signal between the connecting port and the video processing unit according to a control signal; and a controlling unit, coupled to the switching unit and the connecting port, for detecting a mode signal generated by the displaying apparatus to generate the control signal.

2. The video playing apparatus according to claim 1, wherein the mode signal comprises a video standard of the displaying apparatus.

3. The video playing apparatus according to claim 1, wherein when the connecting port is coupled to the displaying apparatus, the controlling unit generates the corresponding control signal according to a level of the mode signal.

4. The video playing apparatus according to claim 1, wherein the first video signal is of a High Definition Multimedia Interface (HDMI) standard, and the second video signal is of a Mobile High Definition Link (MHL) standard, a Displayport standard, or a Thunderbolt standard; and the connecting port is of a High Definition Multimedia Interface (HDMI) standard connecting port, a Mobile High Definition Link (MHL) standard connecting port, a Displayport standard connecting port, or a Thunderbolt standard connecting port.

5. A video displaying apparatus, comprising:

a video playing apparatus, comprising:

- a connecting port for outputting a first video signal or a second video signal;
- a video outputting unit for providing the first video signal;
- a video processing unit, coupled to the video outputting unit and the connecting port, for receiving the first video signal, converting the first video signal to the second video signal, and then outputting the second video signal; and
- a switching unit, coupled to the video outputting unit, the video processing unit, and the connecting port, for switching the output of the first video signal between the connecting port and the video processing unit according to a control signal;

a displaying apparatus, coupled to the connecting port, for displaying the first video signal or the second video signal depending on which one it receives; and a controlling unit, coupled to the switching unit and the connecting port, for detecting a mode signal generated by the displaying apparatus to generate the control signal.

6. The video displaying apparatus according to claim 5, wherein the mode signal comprises a video standard of the displaying apparatus.

7. The video displaying apparatus according to claim 5, wherein when the connecting port is coupled to the displaying apparatus, the controlling unit generates the corresponding control signal according to a level of the mode signal.

8. The video displaying apparatus according to claim 5, wherein the first video signal is of a High Definition Multimedia Interface (HDMI) standard, and the second video signal is of a Mobile High Definition Link (MHL) standard, a Displayport standard, or a Thunderbolt standard; and the connecting port is of a High Definition Multimedia Interface (HDMI) standard connecting port, a Mobile High Definition Link (MHL) standard connecting port, a Displayport standard connecting port, or a Thunderbolt standard connecting port.

* * * * *